United States Patent [19]

Blakesley

[11] Patent Number: 4,575,286

[45] Date of Patent: Mar. 11, 1986

[54] GEAR CUTTER ASSEMBLY

[75] Inventor: Richard C. Blakesley, Holcomb, N.Y.

[73] Assignee: The Gleason Works, Rochester, N.Y.

[21] Appl. No.: 672,741

[22] Filed: Nov. 19, 1984

[51] Int. Cl.[4] .................. B23F 21/12; B23F 21/22
[52] U.S. Cl. .................................. 407/22; 407/43; 407/70
[58] Field of Search ......................... 407/20–29, 407/70, 71, 43, 117

[56] References Cited

U.S. PATENT DOCUMENTS

| 845,489 | 2/1907 | Thomas | 407/117 |
|---|---|---|---|
| 1,899,023 | 2/1933 | Earl | 407/29 |
| 2,392,002 | 1/1946 | Ross | 407/27 |
| 3,487,592 | 1/1970 | Kotthaus | 51/288 |
| 3,571,876 | 3/1971 | Blakesley . | |
| 3,624,879 | 12/1971 | Ayer . | |
| 3,760,476 | 9/1973 | Kotthaus | 407/21 |
| 4,060,881 | 12/1977 | Ryan et al. | 407/22 |
| 4,165,947 | 8/1979 | Smids | 407/46 |
| 4,197,038 | 4/1980 | Hipp et al. | 407/22 |

Primary Examiner—Leonidas Vlachos
Assistant Examiner—Jerry Kearns
Attorney, Agent, or Firm—Ralph E. Harper; Morton A. Polster; Thomas B. Ryan

[57] ABSTRACT

A face milling type gear cutting assembly including contiguous cutting tools positioned in a common slot with means for preserving clearance for chip removal between these tools. The cutting assembly also includes a tool clamping arrangement featuring a novel clamping block which is releasably attached to a screw element in situ.

8 Claims, 8 Drawing Figures

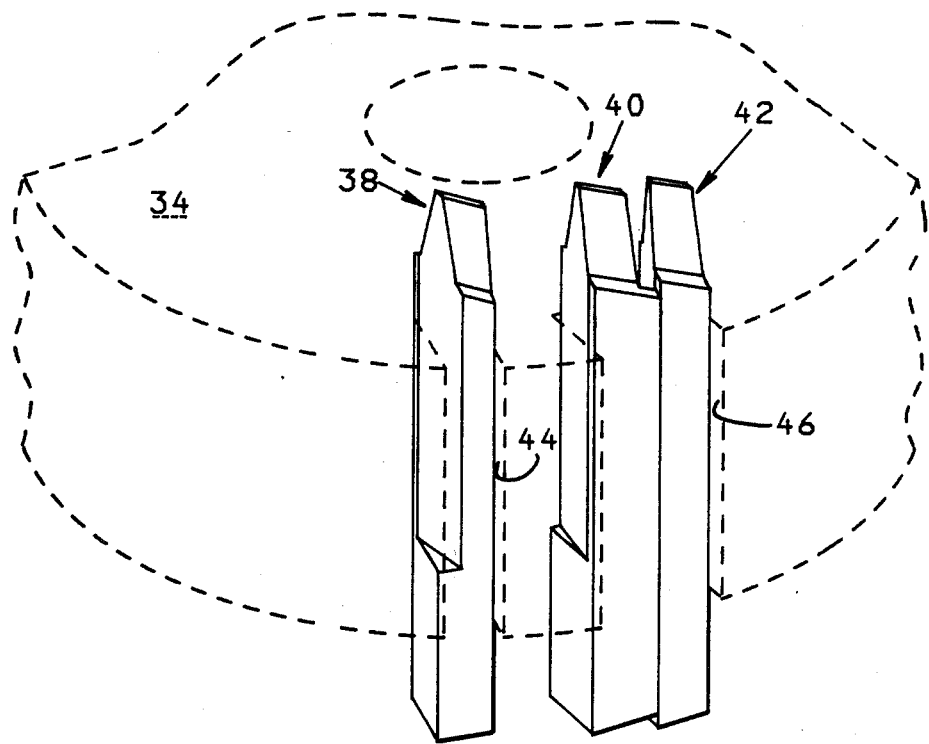
FIG. 5
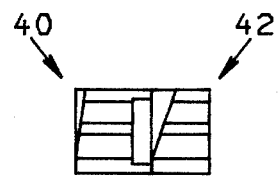
FIG. 7
FIG. 6
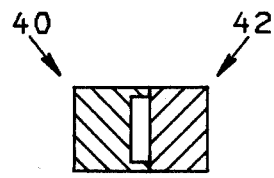
FIG. 8

GEAR CUTTER ASSEMBLY

BACKGROUND OF INVENTION

The invention relates to cutter head assemblies intended for use in gear cutting operations. The cutter assemblies are designed to receive bar stock type tools having an indexable shank portion and profiled cutting surfaces located at one end. The tools are arranged in slots formed in the periphery of a cutter head in positions projecting from a front face thereof. One or more tools may be located in each slot and in the latter instance, a forward and rearward tool may be defined with respect to a cutting direction.

In gear cutting operations, it is often desirable to utilize a maximum number of cutting tools in a given size cutter head. Accordingly, known cutter assembly arrangements provide for locating more than one cutting tool in a common slot formed in a cutter head. In one known design, a pair of cutting tools are located contiguously within the same slot. This arrangement, however, tends to result in chip packing between succeeding cutting tools thereby inhibiting cutting performance. In a second known cutter assembly design, a spacing shim is spot welded to the cutter head between succeeding cutting tools located in a common slot. Although sufficient clearance is provided between succeeding cutting tools to alleviate the chip packing problem, cutter head manufacture is significantly complicated. Difficulties arising from accurately sizing and locating the spacing shim add cost to the manufacture of the cutter head and may adversely affect accurate positioning of the cutting tool.

SUMMARY OF INVENTION

The novel cutter head assembly of the present invention obviates the special shim arrangement of the above mentioned prior art design while preserving clearance between succeeding cutting tools located in a common slot. The present invention provides for cutting clearance through a simple and inexpensive cutting tool modification which is essentially independent of the accuracy requirements of individual tools and the associated cutter assembly. Moreover, these cutting tools may be indexed and reprofiled without disturbing a predetermined clearance between succeeding tools.

The cutter assembly of the present invention includes a pair of cutting tools adapted to fit contiguously in a common slot. The shank portion of the forward most tool of the pair includes a recess formed in a back wall of the tool which extends along the length of the tool. On each side of the tool recess, a narrow portion of the tool back wall remains as an abutting surface for contacting a front wall of a succeeding tool. These remaining back wall portions are sufficiently narrow so as to be easily removed at the cutting end of the tool by ordinary profiling or reprofiling operations on the tool. By removing the remaining narrow portions of the tool back wall at the profiled end of the tool, chip clearance is provided between succeeding cutting tools. The depth of recess provided in the tool back wall may be adjusted to optimize cutting clearance without affecting tool location with respect to the cutter head.

In addition, the forward tool of the tool pair may be increased in thickness with respect to the cutting direction by an amount corresponding approximately to the depth of recess formed in the tool back wall. In this way, profiled cutting ends of each tool of the pair are maintained approximately equal in thickness. More importantly, however, the total thickness of the tool pair is adjusted so that the tool pair exactly fits within the tool slot.

A novel clamping arrangement is also provided for securing cutting tools within the cutter head assembly of the present invention. The cutting tools are received in slots formed in cutter head and are secured by clamping blocks which are operably connected to a circumferential ring member which encloses the entire assembly. The clamping blocks are releasably secured to ring mounted screw elements by snap type connections. This novel clamping arrangement is also intended for securing a range of tool types in gear cutter heads.

These and other features and advantages of the present invention will become apparent in the more detailed discussion which follows, and in that discussion reference will be made to the accompanying drawings as briefly described below.

BRIEF DESCRIPTION OF DRAWINGS

FIG. 5 is an isometric view partly in phantom showing a full view of cutting tools arranged in a cutter head in accordance with the present invention.

FIG. 6 is a bisectional view of the clamping block shown in FIGS. 3 and 4.

FIG. 7 is a top view of a pair of cutting tools in accordance with the present invention.

FIG. 8 is a cross sectional view through a base portion of the same pair of tools shown in FIG. 7.

DETAILED DESCRIPTION OF INVENTION

In face milling type gear cutting assemblies, cutting tools are often arranged in groups about a cutter head. Each group may include separately designed cutting tools for separately cutting the two side walls and the bottom portion of each tooth slot to be formed in a work piece. For instance, an inside cuting tool may be provided to cut one side wall of a tooth slot, an outside cutting tool may be provided to cut the opposite side wall of the same tooth slot, and a bottom cutting tool may be provided for forming the bottom of the tooth slot to be formed in the work piece.

In certain gear cutting operations, such as continuous cutting operations in which a work piece and cutter assembly are rotated together in a timed relationship, it is especially important to accurately position bottom cutting tools for protecting clearance side surfaces of inside and outside cutting tools against excessive wear. Accordingly, the preferred embodiment of the present invention provides for the accurate positioning of a bottom cutting tool contiguously with one of the aforementioned side cutting tools within a common slot.

Although the preferred embodiment includes a particular combination of bottom and side cutting tools positioned contiguously within the same slot, the principles of the present invention relate to any combination of tool designs. In addition, the preferred embodiment includes a particular bar stock type cutting tool in which a front cutting face is preserved during reprofiling operations. The present invention, however, is applicable to any type of bar stock type cutting tools whether a front cutting face is sharpened or not.

Figures 1, 2:
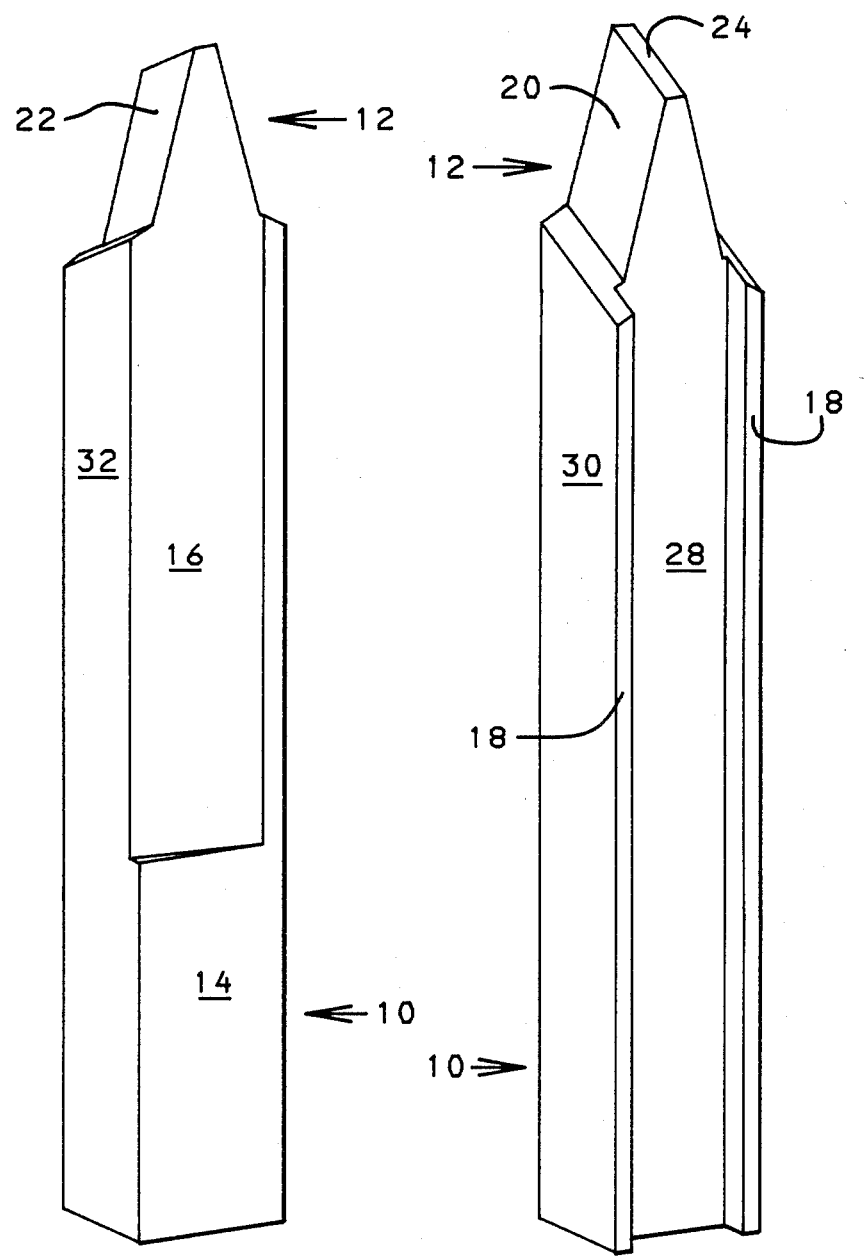
FIG. 1 is a greatly enlarged scale front isometric view of a cutting tool modified in accordance with the present invention.
FIG. 2 is a back isometric view in the same scale and of the same tool as shown in FIG. 1.

Referring to FIGS. 1 and 2, a bottom cutting tool is shown modified in accordance with the preferred embodiment of the present invention. The tool is generally of rectangular cross section and may be formed from a length of bar stock. The tool includes a base portion 10 and a profiled cutting end 12. The generally rectangular form of the tool is defined by front wall 14, back wall 18 and side surfaces 30 and 32. A cutting face 16 is formed in front wall 14 and defines with flank surfaces 20 and 22 and top surface 24 the profiled cutting end 12 of the tool. Of particular importance to the present invention, recess surface 28 is formed in back wall 18. Recess surface 28 extends the length of the tool while preserving narrow portions of back wall 18 on either side. The narrow portions of back wall 18, however, terminate below cutting end 12 due to the formation of flank surfaces 20 and 22 in side surfaces 30 and 32 of the tool respectively. Although not shown, the tool is also intended to include well known radiused portions between top surface 24 and flank surfaces 20 and 22.

Figure 3:
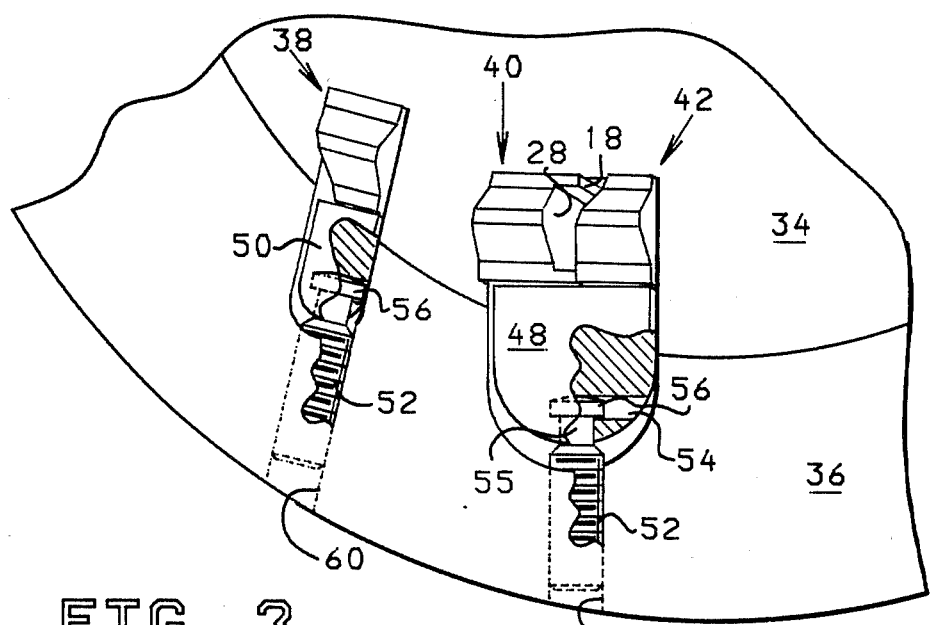
FIG. 3 is a top view of a cutter assembly arranged in accordance with the present invention.
Figure 4:
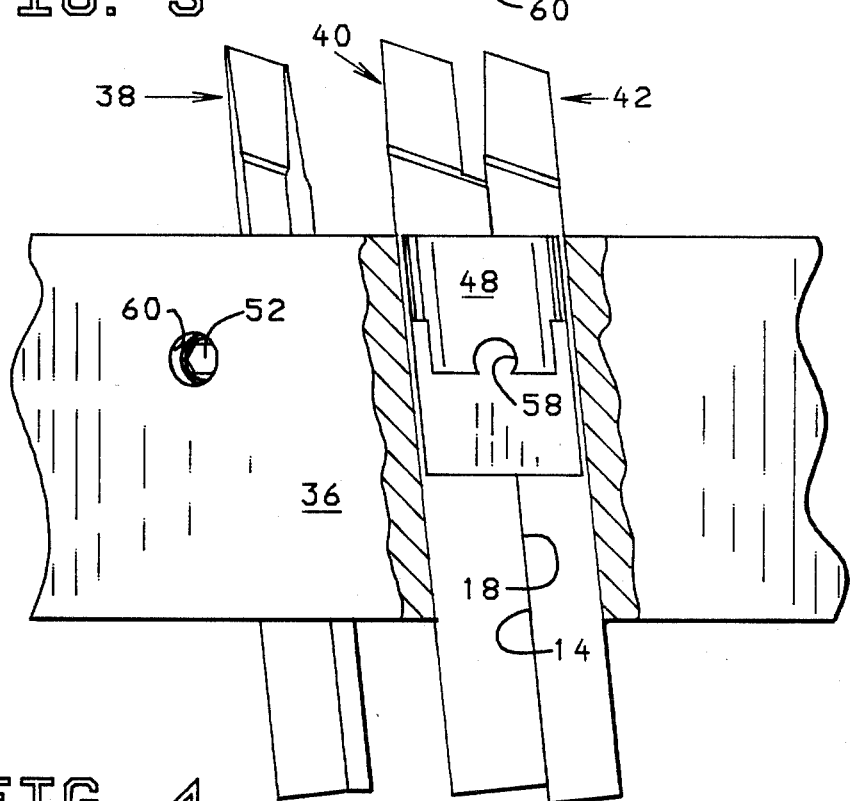
FIG. 4 is a cut away side view of the same cutter assembly shown in FIG. 3.

The cutter assembly of the present invention in its preferred embodiment is shown in FIGS. 3 and 4. The cutter assembly illustrated is applicable to continuous gear cutting operations. The bottom cutting tool shown in FIGS. 1 and 2 is now designated as 40 in the remaining figures. Inside cutting tool 38 and outside cutting tool 42 are also included within the cutter assembly. Corresponding surfaces on these tools are designated with the same reference numerals as bottom cutting tool 40.

The illustrated cutter assembly includes a main body member 34 and a ring member 36 which is shrunk onto or otherwise secured to the main body member 34 after tool receiving slots 44 and 46 (shown in FIG. 5) are formed into main body member 34. Inside cutting tool 38 is positioned within tool receiving slot 44. Of particular importance to the present invention, bottom cutting tool 40 and outside cutting tool 42 are positioned contiguously within tool receiving slot 46. Narrow back wall surfaces 18 of bottom cutting tool 40 abut front wall 14 of outside cutting tool 42. Back wall surfaces 18, however, terminate below the cutting end of bottom cutting tool 40. Accordingly, recess surface 28 of bottom cutting tool 40 together with cutting face 16 of outside tool 42 define a clearance space between the 50 succeeding tools. FIGS. 7 and 8 further illustrate the contiguous relationship of bottom cutting tool 40 and outside cutting tool 42.

The preferred embodiment of the present invention also includes a novel clamping arrangement for releasably securing cutting tools in tool receiving slots. Referring to FIGS. 3, 4 and 6, a novel clamping block 48 is illustrated. Clamping block 48 is adapted to secure cutting tools 40 and 42 within slot 46. A similar clamping block 50 is also provided for securing tool 38 within slot 44. Both blocks are associated with screw elements having shaped head portions 56, narrowed neck portions 55 and threaded portions 52 which are fitted in threaded bores 60 of ring member 36. The threaded portion 52 of each screw element is provided with a recessed outer end of irregular shape for receiving a tool which functions to turn the screw element toward or away from associated cutting tools. Shaped head portions 56 may be appropriately sized to permit passage through threaded bores 60 during assembly. Each block is provided with a through slot 54 and a partially enclosed opening 58 for receiving shaped head portion 56. Furthermore, partially enclosed opening 58 is adapted to embrace slightly more than one half the circumference of narrowed neck portion 55.

This arrangement permits a snap type securement of each clamping block 48, 50 to its associated screw element so that clamping block 48, 50 will not fall out of its respective slot when it is withdrawn from clamping contact or thereafter inverted. Partially enclosed opening 58, however, permits quick release of clamping block 48, 50 when the clamping block is pushed upward through the front face of the assembly with a predetermined amount of force. In this way, clamping blocks can be readily cleaned or replaced without removing screw elements from their threaded bores.

Although not shown, the preferred embodiment may also include well known shim elements for radially adjusting the position of cutting tools within their associated slots. Clamping blocks 48, 50 may be readily replaced, as described above, with appropriately sized clamping blocks for accommodating different size shim elements.

Having described the present invention and a preferred embodiment thereof, it can be appreciated that the concepts disclosed are adaptable to a wide range of gear cutter assemblies without departing from the intended scope of invention.

What is claimed is:

1. In a face milling type cutting assembly for use in gear cutting operations comprising:
   a disc-shaped body having slots for receiving bar stock type cutting tools in positions projecting from a front face thereof;
   bar stock type cutting tools being received in said slots;
   means for securing said bar stock type cutting tools in said slots; two of said bar stock type cutting tools being contiguously positioned in the same slot and generally aligned to a cutting direction; the improvement comprising:
   one of said two bar stock type cutting tools having a back wall with a recess formed therein for providing cutting clearance between said two bar stock type cutting tools during use; and,
   said back wall being defined by two abutment surfaces located on either side of said recess for contacting a front wall of the other of said two bar stock type cutting tools.

2. The face milling type cutting assembly of claim 1 wherein said two abutment surfaces extend along a major portion of the length of said one bar stock type cutting tool.

3. The face milling type cutting assembly of claim 2 wherein said two abutment surfaces terminate below a cutting end of said one bar stock type tool.

4. The face milling type cutting assembly of claim 3 wherein said cutting clearance is defined between a recess surface associated with said one bar stock type tool and a cutting face associated with said other bar stock type tool.

5. The face milling type cutting assembly of claim 4 wherein said cutting end is defined by first and second flank surfaces formed in respective side surfaces of said one bar stock type tool.

6. The face milling type cutting assembly of claim 5 wherein said abutment surfaces are terminated during formation of said flank surfaces.

7. The face milling type cutting assembly of claim 6 wherein said one bar stock type tool includes a cutting edge for cutting a bottom portion of a gear tooth slot and said other bar stock type tool includes a cutting edge for cutting a side wall of the same gear tooth slot.

8. The face milling type cutting assembly of claim 7 wherein another of said bar stock tye tools includes a cutting edge for cutting the opposite side wall of the same tooth slot.

* * * * *